United States Patent [19]
Peña et al.

[11] Patent Number: 5,641,148
[45] Date of Patent: Jun. 24, 1997

[54] SOLENOID OPERATED PRESSURE BALANCED VALVE

[75] Inventors: James A. Peña, Leucadia; Oded E. Sturman, Newbury Park; Peter W. Petersen, San Diego, all of Calif.

[73] Assignee: Sturman Industries, Camarillo, Calif.

[21] Appl. No.: 584,571

[22] Filed: Jan. 11, 1996

[51] Int. Cl.$^6$ ................................................. F16K 31/06
[52] U.S. Cl. ........................ 251/129.07; 251/282; 251/903
[58] Field of Search ......................... 251/129.07, 129.15, 251/129.18, 129.04, 282, 335.3, 903

[56] References Cited

U.S. PATENT DOCUMENTS

| Re. 33,270 | 7/1990 | Beck et al. . | |
|---|---|---|---|
| 1,700,228 | 1/1929 | Kendall . | |
| 2,912,010 | 11/1959 | Evans . | |
| 2,930,404 | 3/1960 | Kowalski . | |
| 2,934,090 | 4/1960 | Kenann et al. . | |
| 2,946,513 | 7/1960 | Sampietro . | |
| 2,967,545 | 1/1961 | Schmidt . | |
| 2,985,378 | 5/1961 | Falberg . | |
| 3,368,791 | 2/1968 | Wells . | |
| 3,587,547 | 6/1971 | Hussey et al. . | |
| 3,627,257 | 12/1971 | Stampfli | 251/129.07 |
| 3,633,869 | 1/1972 | Lehmann | 251/129.18 |
| 3,683,239 | 8/1972 | Sturman . | |
| 3,718,159 | 2/1973 | Tennis . | |
| 3,743,898 | 7/1973 | Sturman . | |
| 3,821,967 | 7/1974 | Sturman et al. . | |
| 3,921,604 | 11/1975 | Links . | |
| 3,995,652 | 12/1976 | Belart et al. . | |
| 4,046,112 | 9/1977 | Deckard . | |
| 4,069,800 | 1/1978 | Kanda et al. . | |
| 4,080,942 | 3/1978 | Vincent et al. . | |
| 4,108,419 | 8/1978 | Sturman et al. . | |
| 4,114,647 | 9/1978 | Sturman et al. . | |
| 4,182,492 | 1/1980 | Albert et al. . | |
| 4,219,154 | 8/1980 | Luscomb . | |
| 4,275,693 | 6/1981 | Leckie . | |
| 4,279,385 | 7/1981 | Straubel et al. . | |
| 4,372,272 | 2/1983 | Walter et al. . | |
| 4,378,775 | 4/1983 | Straubel et al. . | |
| 4,381,750 | 5/1983 | Funada . | |
| 4,392,612 | 7/1983 | Deckard et al. . | |
| 4,396,151 | 8/1983 | Kato et al. . | |
| 4,405,082 | 9/1983 | Walter et al. . | |
| 4,409,638 | 10/1983 | Sturman et al. . | |
| 4,414,940 | 11/1983 | Loyd . | |

(List continued on next page.)

FOREIGN PATENT DOCUMENTS

| 2209206 | 8/1973 | Germany . | |
|---|---|---|---|
| 4-341653 | 4/1992 | Japan . | |
| 264710 | 1/1950 | Switzerland . | |
| 349165 | 5/1931 | United Kingdom . | |
| 892121 | 3/1962 | United Kingdom . | |
| 933758 | 8/1963 | United Kingdom | 251/335.3 |

*Primary Examiner*—Kevin Lee
*Attorney, Agent, or Firm*—Blakely Sokoloff Taylor and Zafman

[57] ABSTRACT

A pressure balanced gas control valve which uses a bellows to hermetically seal the solenoid from the valve. The gas valve has a valve housing which has an inlet port, an outlet port and a valve seat. Within the housing is a needle valve that moves between an open position and a closed position. The needle valve cooperates with the valve seat to control the flow of gas through the valve. The needle valve is moved to the open position by a solenoid and returned to the closed position by a spring. The bellows is attached to both the needle valve and the housing to prevent gas from flowing into the solenoid and contaminating the solenoid components. The bellows has an effective pressure area which is equal to the needle valve seat area such that there is a net force on the needle valve from the gas pressure that is approximately zero when the needle valve is in the closed position. The net zero force provides a gas valve which does not require additional force to open the needle valve. With pressure force of approximately zero, the force required to open the needle valve is constant over the entire pressure regime and is only a function of the mechanical spring used to close the needle valve.

15 Claims, 3 Drawing Sheets

U.S. PATENT DOCUMENTS

| | | |
|---|---|---|
| 4,482,094 | 11/1984 | Knape . |
| 4,550,875 | 11/1985 | Teerman et al. . |
| 4,605,166 | 8/1986 | Kelly . |
| 4,625,918 | 12/1986 | Funada et al. . |
| 4,628,881 | 12/1986 | Beck et al. . |
| 4,741,478 | 5/1988 | Teerman et al. . |
| 4,770,346 | 9/1988 | Kaczynski . |
| 4,796,854 | 1/1989 | Ewing ................................. 251/282 X |
| 4,821,773 | 4/1989 | Herion et al. . |
| 4,838,310 | 6/1989 | Scott et al. ...................... 251/129.04 X |
| 4,941,504 | 7/1990 | Beauvir ............................. 251/335.3 X |
| 4,979,674 | 12/1990 | Tiara et al. . |
| 5,036,885 | 8/1991 | Mirva . |
| 5,108,070 | 4/1992 | Tominaga . |
| 5,133,386 | 7/1992 | Magee . |
| 5,143,291 | 9/1992 | Grinsteiner . |
| 5,232,195 | 8/1993 | Torrielli ............................. 251/903 X |
| 5,251,659 | 10/1993 | Sturman et al. . |
| 5,460,329 | 10/1995 | Sturman . |
| 5,463,996 | 11/1995 | Maley et al. . |

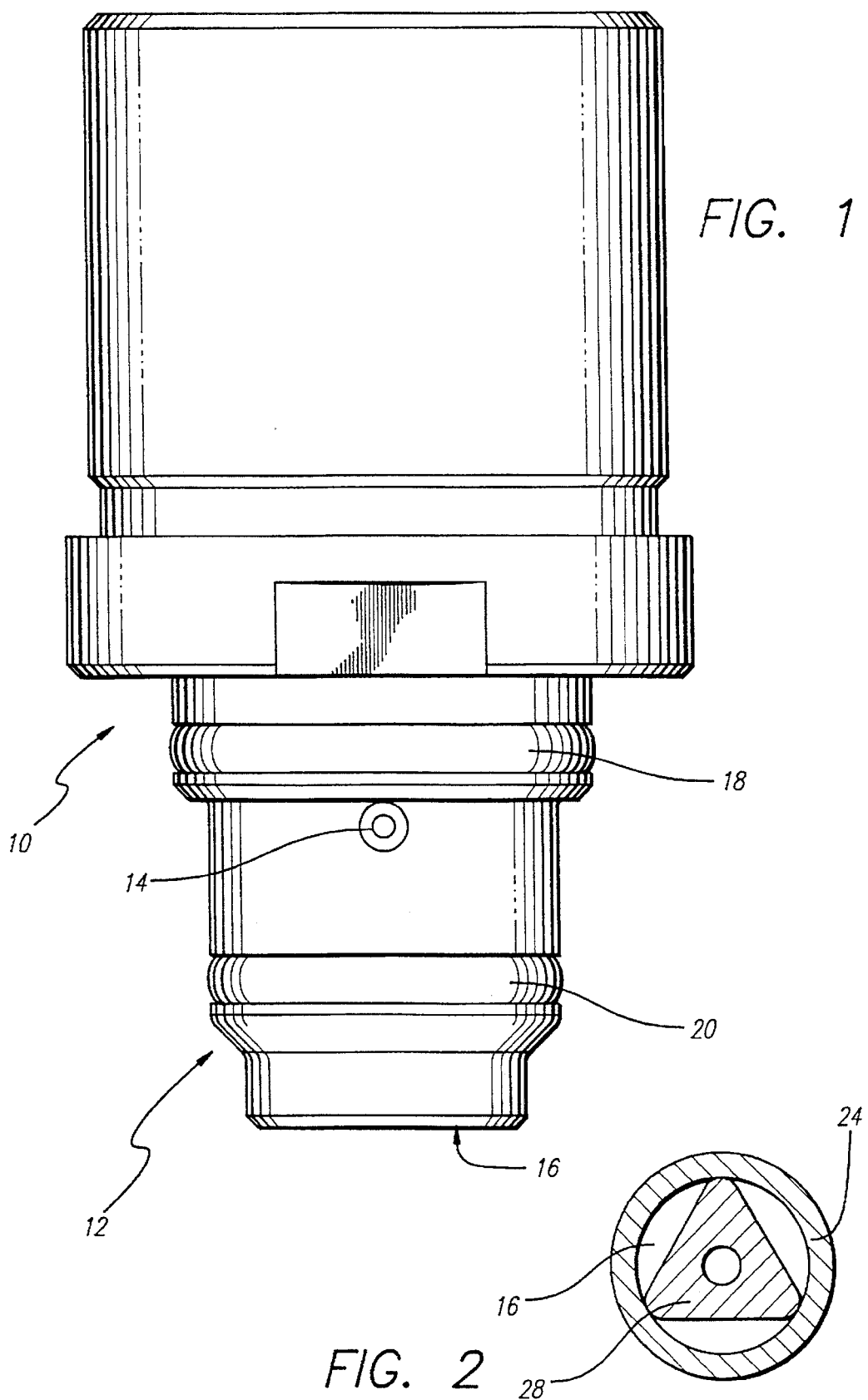

SOLENOID OPERATED PRESSURE BALANCED VALVE

BACKGROUND OF THE INVENTION

1. Field of the Invention

The present invention relates to a solenoid actuated gas valve.

2. Description of Related Art

It is desirable to provide an alternate fuel(s) to gasoline and diesel for internal combustion engines. One alternate fuel candidate is natural gas. Natural gas typically generates less pollutants and is generally less expensive than gasoline or diesel.

The flow of natural gas within an internal combustion engine must be controlled by a valve(s). Conventional gas valves contain a poppet, ball or needle valve that is moved into an open position by a solenoid. The solenoid is typically located within a cavity that is exposed to the natural gas flowing through the valve. The gas may pick up microscopic metal particles from the fluid lines. These metal particles become attracted to the magnetic material of the solenoid. The metal particles may become attached to the magnetic material and create a film that degrades the performance of the solenoid. Additionally, oils and water in the gas which come into contact with the solenoid may gum and/or corrode the solenoid components over time. It would be desirable to provide a solenoid actuated gas valve that seals the solenoid from the gas.

Present gas valves are typically pressure unbalanced so that the pressure of the gas tends to maintain the valve in the closed position. The biasing force of the gas pressure requires additional force to open the valve, thereby reducing the energy efficiency of the device. The biasing force of the gas pressure can be lowered by reducing the area of the valve seat. Reducing the seat area increases the stress on the valve and reduces available flow area. The additional stress can accelerate material wear. The material wear will enlarge the seat opening and change the flowrate through the valve over time. Material wear at the seat will also increase the valve lift and also change the flowrate through the valve over time.

To prevent material wear and failure, present gas valves are typically constructed from hard metal materials. It has been found that the interface between the valve seat and a hard valve may have microscopic channels even when the valve is in the closed position. The microscopic channels allow gas to leak therethrough. When used in an internal combustion engine the gas can leak into the combustion chamber during the power and exhaust strokes, resulting in the emission of uncombusted natural gas. It would be desirable to provide a gas valve that has a truly sealed valve seat, produces a relatively constant flowrate through the valve over the life of the valve, has a performance which is independent of gas pressure, and isolates the solenoid portion of the valve device from contact with the gas medium to prevent solenoid contamination and premature failure.

SUMMARY OF THE INVENTION

The present invention is a pressure balanced gas control valve which uses a bellows to hermetically seal the solenoid from the valve. The gas valve has a valve housing which has an inlet port, an outlet port and a valve seat. Within the housing is a needle valve that moves between an open position and a closed position. The needle valve cooperates with the valve seat to control the flow of gas through the valve. The needle valve is moved to the open position by a solenoid and returned to the closed position by a spring. The bellows is attached to both the needle valve and the housing to prevent gas from flowing into the solenoid and contaminating the solenoid components. The bellows has an effective pressure area which is equal to the needle valve seat area such that there is a net force on the needle valve from the gas pressure that is approximately zero when the needle valve is in the closed position. The net zero force provides a gas valve which does not require additional force to open the needle valve. With a pressure force of approximately zero, the force required to open the needle valve is constant over the entire pressure regime and is only a function of the mechanical spring used to close the needle valve. This pressure force balance allows the use of a relatively large needle valve seat, not possible with an unbalanced design. This results in low seat stresses which enables the needle valve to be constructed from a relatively soft material that produce effective gas sealing characteristics. The needle valve is preferably constructed from a plastic material which deforms onto the valve seat to seal the seat portion of the valve. The inlet port has a flow restrictor that has an area smaller than the opened seat area. The flow restrictor limits the flowrate of the gas to a maximum value even when the valve seat or needle lift is enlarged because of wear.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a side view of a gas valve of the present invention;

FIG. 2 is a bottom view of the gas valve of FIG. 1;

DETAILED DESCRIPTION OF THE INVENTION

Figure 3:
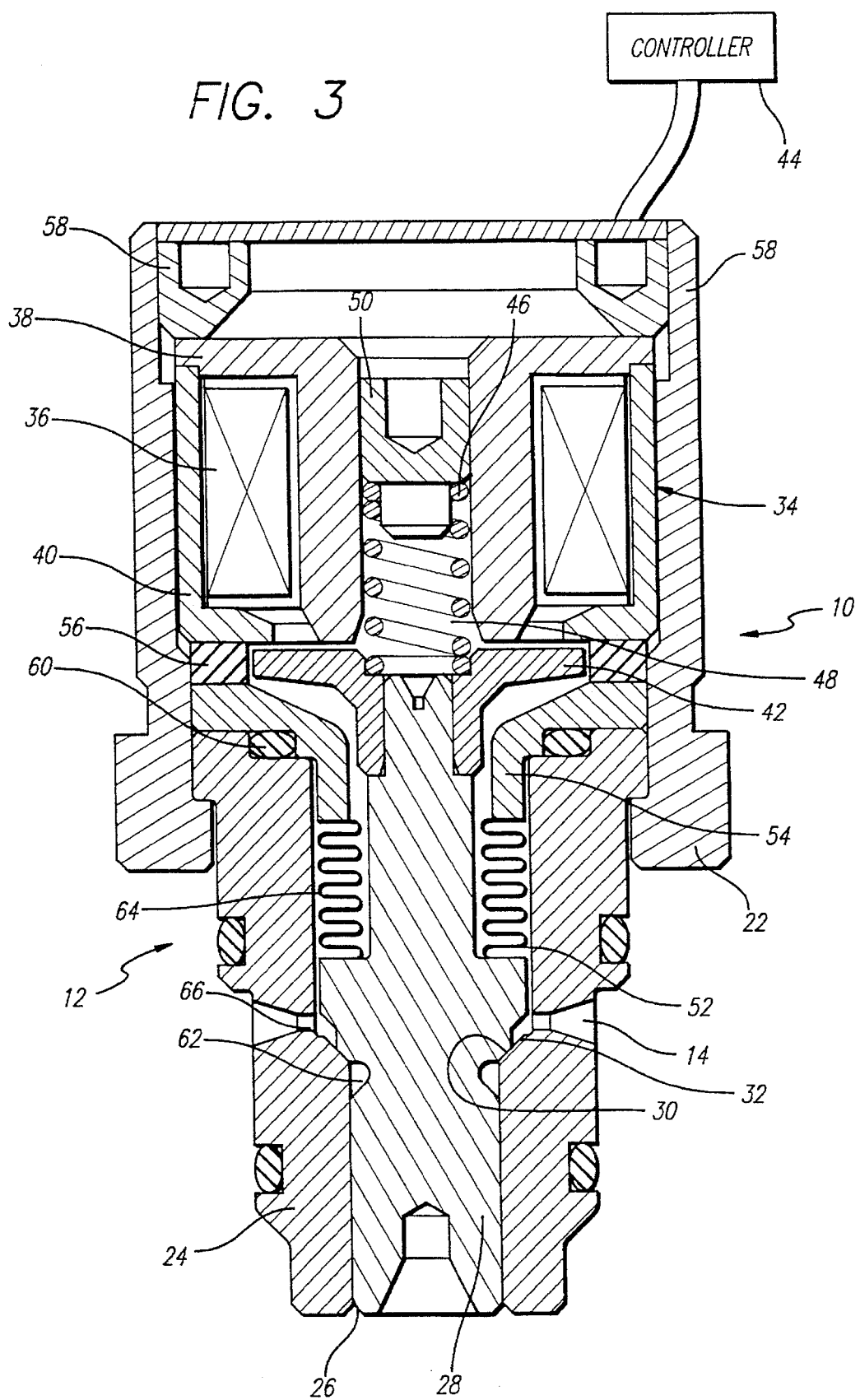
FIG. 3 is a cross-sectional view of the gas valve of FIG. 1.

Referring to the drawings more particularly by reference numbers, FIGS. 1 and 2 show a gas valve 10 of the present invention. The gas valve 10 is typically used to control the flow of gaseous fuels. By way of example, the gas valve 10 can be used to control the flow of natural gas into the combustion chamber of an internal combustion engine. Although use in an internal combustion engine is described, it is to be understood that the valve may have other applications.

The gas valve 10 includes a housing 12 which has an inlet port 14 and an outlet port 16. The valve preferably has multiple separate inlet ports 14 and three corresponding outlet openings 16 located symmetrically about the housing. The gas valve 10 may include a first O-ring 18 and a second O-ring 20 that seal the valve to an external device such as an engine block.

As shown in FIG. 3, the housing 12 preferably contains an upper body member 22 attached to a lower body member 24. The body members are typically constructed from a metal material such as steel. The lower body member 24 contains the inlet ports 14 and a central guide bore 26. Extending through the guide bore 26 is a needle valve 28. The needle valve 28 has a valve seat portion 30 that cooperates with a seat portion 32 of the lower body member 24 to control the flow of gas from the inlet port 14 to the outlet port(s) 16. As shown in FIG. 2, the needle valve 28 preferably has a lower triangular shaped cross-section which together with the lower member 24 define the three outlet ports 16. In the preferred embodiment, the needle valve 28 is constructed from a plastic material that is impervious to natural gas. The material may be a plastic sold under the trademarks PEEK or VESPEL by E. I. Du Pont de Nemours.

The needle valve 28 is operated by a solenoid 34 that can move the needle valve 28 into an open position. The solenoid 34 has a coil 36 that is wrapped around an inner pole 38 and enclosed by an outer pole 40. The poles 38 and 40 are magnetically coupled to an armature 42 that is attached to the needle valve 28. The solenoid 34 is typically connected to a controller 44 that can provide an electrical signal to the coil 36. The electrical signal creates a magnetic field which pulls the armature 42 into contact with the poles and opens the needle valve 28. The armature 42 and poles 38 and 40 are preferably constructed from a steel material which has enough residual magnetism to maintain the position of the armature 42 even when power to the coil 36 is terminated. In the preferred embodiment the material is a 52100, 440C or 4140 steel.

The gas valve 10 includes a spring 46 that moves the needle valve 28 from the open position to the closed position. The spring 46 extends through a center opening 48 of the inner pole 38. The deflection and resulting spring force of the spring 46 can be manually varied by a plug 50.

The gas valve 10 further has a bellows 52 that seals the solenoid 34 from contacting gas through the valve 10. The bellows 52 is attached to the needle valve 28 and a flange 54 of the valve housing 12. The bellows 52 is preferably constructed from a relatively pure nickel material which is impervious to gas corrosion and is capable of withstanding a large number of deflections. The metal bellows 52 also provides a spring force that biases the needle valve 28 into the closed position.

The flange 54 is typically spaced from the poles by a spacer 56. The spacer 56 prevents interference between the armature 42 and the flange 54. The spacer 56 is preferably constructed from a non-magnetic material that does not allow the magnetic flux generated by the energized coil to flow through the flange 54 and pull the armature 42 away from the poles 36 and 38. The flange 54, spacer 56 and poles 36 and 38 are typically clamped to the lower body member 24 by a clamp cover 58 that is attached to the upper body member 22. The gas valve 10 may further have an O-ring 60 that prevents gas from leaking past the flange 54. The solenoid 34 is totally sealed from the inlet ports 14 so that the solenoid components are not contaminated by foreign matter introduced to the valve by the gas.

Figure 4:
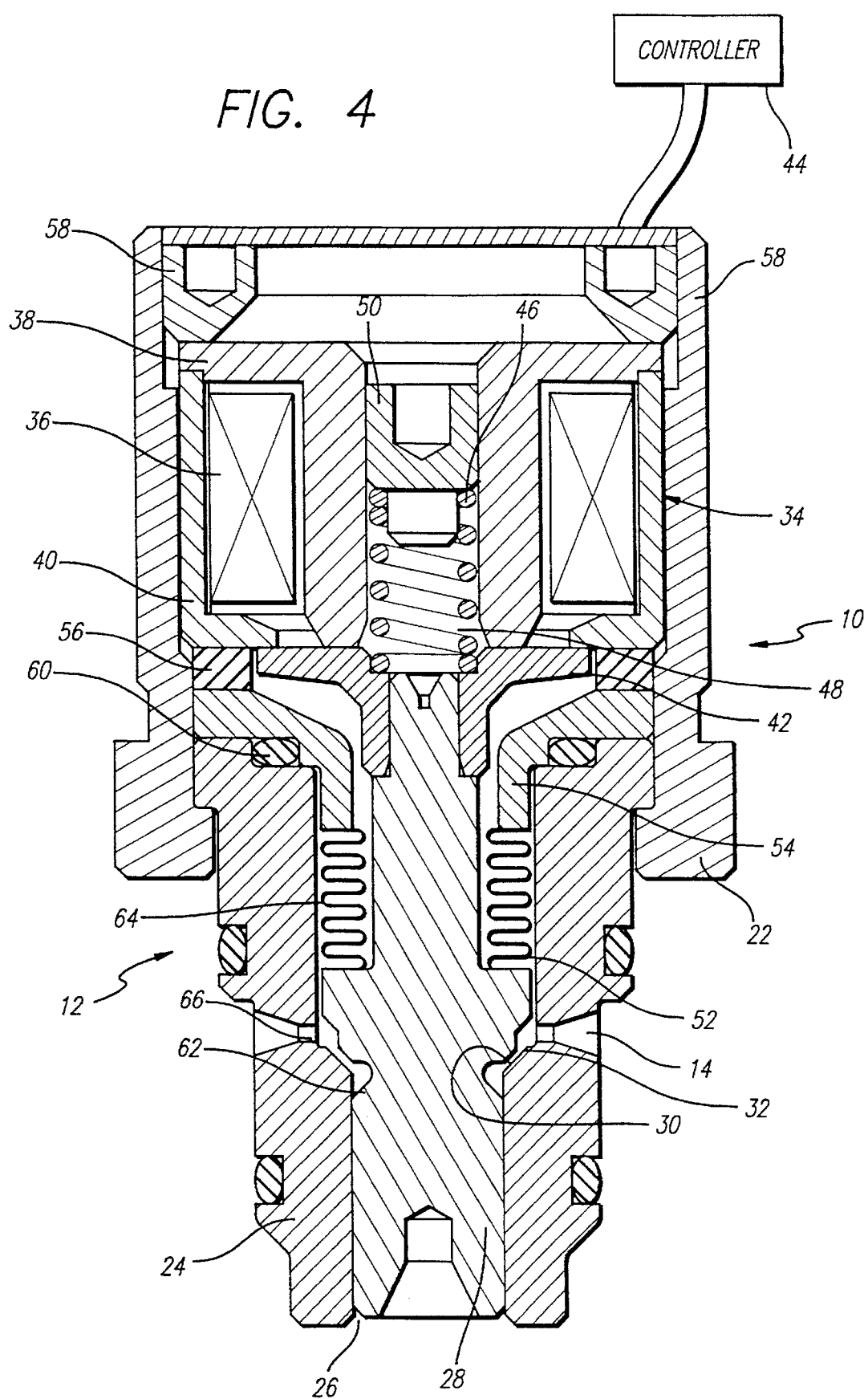
FIG. 4 is a cross-sectional view similar to FIG. 3 showing the valve in an open position.

As shown in FIG. 4, in operation, the controller 44 provides an electrical signal to the coil 36 to energize the solenoid 34 and open the needle valve 28. The open needle valve 28 allows gas to flow from the inlet ports 14 to the outlet ports 16. The needle valve 28 may have a groove 62 that provides fluid communication between the inlet ports 14 and the various outlet openings 16 of the valve 10.

When the needle valve 28 is in the closed position, the gas pressure exerts a force on all of the components in contact with the gas. The seat 30 area is equal to the effective bellows 64 area. These two areas being equal prevent any pressure force component from influencing the needle valve 28. This zero net force on the needle valve 28 is independent of pressure. The zero net pressure force on the needle valve 28 allows the valve 28 to open against high pressure while maintaining a relatively large seat area. This allows for consistent operation over the entire pressure range of the valve 10.

The large seat 30, 32 area results in very low seat contact stresses on the needle valve seat 30, and on the seat 32, of the lower body member 24. This enables the use of the preferred plastic needle valve 28, and use of relatively soft metal material for the lower body member 24.

Each inlet port 14 preferably contains a flow restrictor 66. The flow restrictors 66 in total, have a flow area that is smaller than the flow area between the housing seat 32 and the valve seat 30 when the needle valve 28 is in the open position. The flow restrictors 66 limit the maximum of the gas that flows through the valve 10. The flow restrictors 66 maintain a relatively constant flowrate through the valve 10, even if the seat opening becomes enlarged because of material wear on the needle valve 28.

The needle valve 28 is closed by demagnetizing the solenoid 34. The force of the spring 46 pushes the armature 42 and closes the valve 28. The relatively soft plastic material of the valve 28 will typically conform and comply with the shape of the housing seat 32. The deformation of the plastic material fills in microscopic pits and channels within the housing seat and prevents gas from leaking into the outlet ports 16 when the valve is in the closed position. The plastic needle valve 28 therefore provides a sealed valve seat.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A gas valve, comprising:

a valve housing that has an inlet port, an outlet port and a housing seat;

a needle valve that can move between an open position and a closed position, said needle valve having a valve seat that cooperates with said housing seat to control a flow of gas from said inlet port to said outlet port, said valve seat having a needle valve seat area;

a solenoid that moves said needle valve to the open position; and, a bellows that is attached to said needle valve and said valve housing to seal said solenoid from said inlet port, wherein said bellows provides an effective pressure area equal to said needle valve seat area when said needle valve is in the closed position such that there is a net pressure force on said needle valve that is approximately zero.

2. The gas valve as recited in claim 1, wherein said valve seat and said housing seat have an opening that has an area that is larger than an area of said inlet port, wherein said inlet port restricts the flow of gas from said inlet port to said outlet port.

3. The gas valve as recited in claim 1, wherein said valve housing is constructed from a metal material and said needle valve is constructed from a plastic material.

4. The gas valve as recited in claim 1, further comprising a spring that moves said needle valve from the open position to the closed position.

5. The gas valve as recited in claim 1, wherein said solenoid includes a coil wrapped around a pole that is magnetically coupled to an armature that is attached to said needle valve.

6. The gas valve as recited in claim 1, further comprising a controller that provides a signal to said coil to energize said solenoid and move said needle valve to the open position.

7. The gas valve as recited in claim 4, further comprising a plug that can vary a spring force of said spring.

8. The gas valve as recited in claim 1, wherein said bellows is constructed from a metal material.

9. A gas valve, comprising:

a valve housing that has an inlet port, an outlet port and a housing seat;

a needle valve that can move between an open position and a closed position, said needle valve having a valve seat that cooperates with said housing seat to control a flow of gas from said inlet port to said outlet port, said needle valve having a longitudinal axis that is essentially parallel with a movement of said needle valve;

a solenoid that moves said needle valve to the open position;

a spring that moves said needle valve to the closed position; and, a bellows that is attached to said needle valve and said valve housing to seal said solenoid from said inlet port, said bellows having an effective pressure area equal to a needle valve seat area such that there is a net force on said needle valve from the gas pressure that is approximately zero when said needle valve is in the closed position.

10. The gas valve as recited in claim 9, wherein there is an opening between said valve seat and said housing seat that has an area that is larger than an area of said inlet port, wherein said inlet port restricts the flow of gas from said inlet port to said outlet port.

11. The gas valve as recited in claim 9, wherein said valve housing is constructed from a metal material and said needle valve is constructed from a plastic material.

12. The gas valve as recited in claim 9, wherein said solenoid includes a coil wrapped around a pole that is magnetically coupled to an armature that is attached to said needle valve.

13. The gas valve as recited in claim 9, further comprising a controller that provides a signal to said coil to energize said solenoid and move said needle valve to the open position.

14. The gas valve as recited in claim 9, further comprising a plug that can vary a spring force of said spring.

15. The gas valve as recited in claim 9, wherein said bellows is constructed from a metal material.

* * * * *